(12) United States Patent
Hessler et al.

(10) Patent No.: US 10,134,199 B2
(45) Date of Patent: Nov. 20, 2018

(54) RIGGING FOR NON-RIGID STRUCTURES

(71) Applicant: Pixar, Emeryville, CA (US)

(72) Inventors: Mark C. Hessler, Oakland, CA (US);
Jeremie Talbot, San Francisco, CA (US); Mark Piretti, San Francisco, CA (US); Kevin A. Singleton, Concord, CA (US)

(73) Assignee: Pixar, Emeryville, CA (US)

( * ) Notice: Subject to any disclaimer, the term of this patent is extended or adjusted under 35 U.S.C. 154(b) by 97 days.

(21) Appl. No.: 15/283,135

(22) Filed: Sep. 30, 2016

(65) Prior Publication Data

US 2018/0025525 A1 Jan. 25, 2018

Related U.S. Application Data

(60) Provisional application No. 62/365,700, filed on Jul. 22, 2016.

(51) Int. Cl.
*G06T 17/00* (2006.01)
*G06T 19/20* (2011.01)
*G06T 13/20* (2011.01)

(52) U.S. Cl.
CPC .............. *G06T 19/20* (2013.01); *G06T 13/20* (2013.01); *G06T 2200/24* (2013.01); *G06T 2219/2016* (2013.01)

(58) Field of Classification Search
None
See application file for complete search history.

(56) References Cited

U.S. PATENT DOCUMENTS

| 2006/0170676 | A1* | 8/2006 | Ugail | G06T 17/10 345/421 |
| 2006/0274070 | A1* | 12/2006 | Herman | A63F 13/10 345/474 |
| 2013/0107003 | A1* | 5/2013 | Lim | G06T 13/40 348/46 |

\* cited by examiner

*Primary Examiner* — Peter Hoang
(74) *Attorney, Agent, or Firm* — Patterson + Sheridan, LLP

(57) ABSTRACT

Techniques for animating a non-rigid object in a computer graphics environment. A three-dimensional (3D) curve rigging element representing the non-rigid object is defined, the 3D curve rigging element comprising a plurality of knot primitives. One or more defined values are received for an animation control attribute of a first knot primitive. One or more values are generated, for a second animation control attribute for a second knot primitive, based on the plurality of animation control attributes of a neighboring knot primitive. An animation is then rendered using the 3D curve rigging element. More specifically, one or more defined values for the first attribute of the first knot primitive and the generated value for the second attributes of the second knot primitive are used to generate the animation. The rendered animation is output for display.

20 Claims, 8 Drawing Sheets

RIGGING FOR NON-RIGID STRUCTURES

CROSS-REFERENCE TO RELATED APPLICATIONS

This application claims benefit of U.S. provisional patent application Ser. No. 62/365,700, filed Jul. 22, 2016, which is herein incorporated by reference in its entirety.

BACKGROUND

Field of the Invention

The present disclosure relates to the field of computer animation and, in particular, to rigging non-rigid structures.

Description of the Related Art

This application relates to the field of computer graphics and animation and to the interfaces for defining the same. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking rendered images and animations.

SUMMARY

One embodiment provides a method of animating a non-rigid object in a computer graphics environment. The method includes defining a first three-dimensional (3D) curve rigging element representing the non-rigid object, the 3D curve rigging element comprising a plurality of knot primitives, where each of the plurality of knot primitives corresponds to (i) a respective position within a three-dimensional scene and (ii) a respective plurality of animation control attributes that control the movement of the knot primitive during animation. The method also includes receiving one or more defined values for a first one or more of the plurality of animation control attributes for a first one or more of the plurality of knot primitives. Additionally, the method includes generating one or more values, for a second one or more of the plurality of animation control attributes for a second one or more of the plurality of knot primitives, for which a defined value was not received, based on the plurality of animation control attributes of a neighboring knot primitive. The method further includes rendering an animation of the 3D curve rigging element, using the one or more defined values for the first one or more attributes for the first one or more one knot primitives, and the generated one or more values for the second one or more attributes for the second one or more knot primitives. The method includes outputting the rendered animation for display.

Another embodiment provides a system that includes a processor and a non-transitory memory containing computer program code that, when executed by the processor, performs an operation for animating a non-rigid object in a computer graphics environment. The operation includes defining a first three-dimensional (3D) curve rigging element representing the non-rigid object, the 3D curve rigging element comprising a plurality of knot primitives, where each of the plurality of knot primitives corresponds to (i) a respective position within a three-dimensional scene and (ii) a respective plurality of animation control attributes that control the movement of the knot primitive during animation. The operation also includes receiving one or more defined values for a first one or more of the plurality of animation control attributes for a first one or more of the plurality of knot primitives. Additionally, the operation includes generating one or more values, for a second one or more of the plurality of animation control attributes for a second one or more of the plurality of knot primitives, for which a defined value was not received, based on the plurality of animation control attributes of a neighboring knot primitive. The operation further includes rendering an animation of the 3D curve rigging element, using the one or more defined values for the first one or more attributes for the first one or more one knot primitives, and the generated one or more values for the second one or more attributes for the second one or more knot primitives. The operation includes outputting the rendered animation for display.

Yet another embodiment provides a non-transitory computer-readable medium that contains computer program code that, when executed by operation of one or more processors, performs an operation for animating a non-rigid object in a computer graphics environment. The operation includes defining a first three-dimensional (3D) curve rigging element representing the non-rigid object, the 3D curve rigging element comprising a plurality of knot primitives, where each of the plurality of knot primitives corresponds to (i) a respective position within a three-dimensional scene and (ii) a respective plurality of animation control attributes that control the movement of the knot primitive during animation. The operation also includes receiving one or more defined values for a first one or more of the plurality of animation control attributes for a first one or more of the plurality of knot primitives. Additionally, the operation includes generating one or more values, for a second one or more of the plurality of animation control attributes for a second one or more of the plurality of knot primitives, for which a defined value was not received, based on the plurality of animation control attributes of a neighboring knot primitive. The operation includes rendering an animation of the 3D curve rigging element, using the one or more defined values for the first one or more attributes for the first one or more one knot primitives, and the generated one or more values for the second one or more attributes for the second one or more knot primitives. The operation includes outputting the rendered animation for display.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
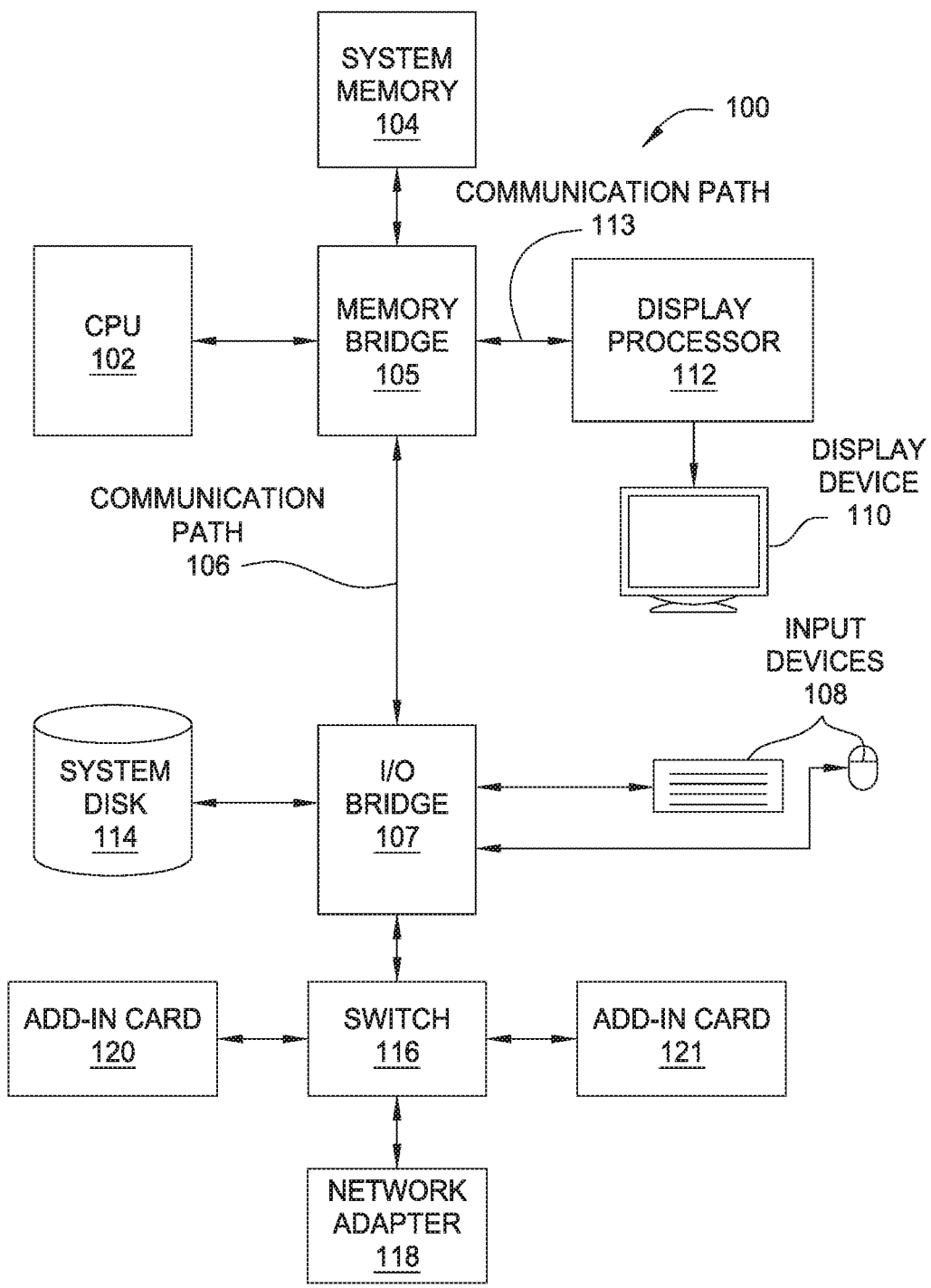
FIG. 1 depicts one architecture of a system within which embodiments of the present disclosure may be implemented.

In computer-generated animation, a character's appearance is defined by a three-dimensional computer model. To appear realistic, the computer model of a character is often extremely complex, having millions of surfaces and tens of thousands of attributes. Due to the complexity involved with animating such complex models, animation tools often rely on animation variables to define the character's animation. Animation variables, which are sometimes referred to as avars, are parameters used by complicated functions, often referred to as deformers, to modify the pose or bodily position of a character model.

Generally, the values of animation variables can vary over time, and the changes this produces are responsible for the animation effect observed by the viewer. The pairing of an animation variable value and the moment in time that value is in effect is often referred to in the industry as a keyframe. Keyframes may or may not be present for all time values. There are several public and also proprietary methods for interpolating the value of an animation variable at the times in between keyframes, thus controlling the appearance and motion of the character between specified keyframes.

The association between animation variables and deformer functions (and the configuration of the same) is categorically known as the character's rigging. There are several public and proprietary methods and techniques used in computer animation rigging. The type of rigging used and how it is controlled by animation variables defines how an animated character can be made to move. For instance, a rig could be generated (e.g., for an organic character) that effectively describes the skeleton of the character. As an example, such a rig could specify a number of joints of the character, their locations, how the joints are permitted to move, rotate, and so on. The eventual effect of the rigging, through deformer functions, is to distort the original three-dimensional character model into the desired shape and position, where the character model can then be rendered and viewed.

Animation variables can be relatively simple, such as those used to specify the position and orientation of a model or a portion thereof. For example, simple animation variables can specify the rotation angles of the joints of a character model, thereby positioning the character model's limbs and appendages. More complicated animation variables can be used to abstract complicated modifications of a character model to a relatively simple control. For example, complicated animation variables can define the degree of opening of a character's mouth. In this example, the value of the animation variable is processed and transformed internal to the rigging, with the results provided to one or more complicated deformer functions to control the position, orientation, and deformation of the many different parts of the character model needed to open the characters mouth to the desired degree.

For some animation variables, animation programs allow for direct, in-camera manipulation of animation variable values. This capability is typically limited to a small subset of the animation variables in a character, usually those controlling the primary translation, rotation or scale of a body part or feature. For example, a user can click and drag a model in a rendered view to a new position to set the value of the model's position animation variables. This direct manipulation interface allows the user to visually (and often interactively) manipulate the model to specify the values of animation variables. Animation variables without direct manipulators are usually edited with other less-representative user interface elements such as text boxes or sliders placed adjacent to the rendered view.

Generally, in computer animation, a three dimensional (3D) object, such as an animatable character, is first modeled, via a static 3D mesh to represent the 3D object. The modeled 3D object is then bound, or attached, to a system of joints, bones, and control handles to prepare the object for animation. This process is generally known as rigging. Once the object is rigged, one or more animators define motions of the various joints, bones, and control handles to cause the rigged object to perform a variety of motions as appropriate for the character, such as walking, running, crawling, and motions of the mouth, as when smiling, laughing, or speaking.

To animate a 3D object, an animator typically performs many thousands of manipulations to cause the object to perform the various functions in various scenes in a smooth and believable manner. These manipulations are performed by selecting and moving various "manipulators," where each manipulator causes a portion of the 3D object to change position, rotation, scale up or down, and so on. Typically, manipulators appear as 3D user interface elements with handles that may be moved or dragged. These actions can be mapped to one or more animation variables as part of the rigging. Using a manipulator can alter the values of the animation variables, which in turn alters the behavior of the deformers resulting in the desired motion of the 3D object. In general, the animator selects a portion of geometry of the 3D object (e.g., via a graphical user interface associated with an animation application program), where the selection causes one or more manipulators associated with the geometry to appear. The animator then selects one of the manipulators and performs a function on the manipulator, such as dragging, in order to move, rotate, or scale the associated portion of geometry. The animator continues this process for each keyframe in the animation to cause the 3D object to move in the desired manner.

Rigging non-rigid structures presents a particular challenge, as such structures typically do not have predefined joints, bones or other fixed control handles at which they move. For example, a model for a rigid structure (e.g., a model representing a human being) may have a predefined set of joints at which the structure can bend and flex (e.g., joints that control how a human's various appendages can move). However, a non-rigid model (e.g., a model representing a blade of grass, a model representing an octopus tentacle, etc.) may not have any such fixed locations at which the modelled object is able to bend, but rather is capable of bending at any point along the model. As an example, a model for a blade of grass may not include any predefined joints, as every point on the blade of grass may be capable of bending and flexing.

As such, embodiments described herein provide a rigging system for non-rigid structures. More specifically, embodiments provide a rendering component configured to provide rigging of non-rigid portions of an animated character using a three-dimensional curve rigging element (or curve spline). In one embodiment, the rendering component is configured to define a 3D curve rigging element using a plurality of 3D knot primitives. That is, the 3D curve rigging element could be constrained by the plurality of 3D knot primitives, such that the 3D curve rigging element must pass through each of the plurality of knot primitives.

In one embodiment, each of the plurality of knot primitives comprises a respective scene graph object. As such, each of the plurality of knot primitives comprises an individually addressable piece of the three-dimensional scene. In other words, rather than defining the curve element as a set of sub-elements and editing all of the sub-elements together as a set, embodiments enable animators to manipulate each of the plurality of knot primitives as a separate, distinct object within the three-dimensional scene. As such, a user can define a constraint specifically for a particular one of the plurality of knot primitives (e.g., binding the particular knot primitive to a point within the three-dimensional scene). By allowing animators to individually constrain each and every one of the plurality of knot primitives, embodiments provide a more flexible and powerful tool for animating a curved element within a three-dimensional scene.

Each 3D knot primitive may also include a set of animation control variables. In one embodiment, the rendering component determines, using a set of criteria and/or heuristics, how a particular curve should be shaped, in order for the curve to have it pass through the knot primitives. In one embodiment, the rendering component uses an algorithm to model the curve rigging element in accordance with the knot primitives. Such an algorithm may perform processing based on tangent calculations, arc values, geometry twists, etc.

In one embodiment, the rendering component provides a user interface through which a user may directly interact with the knot primitives. For example, the rendering component could output a graphical user interface depicting the 3D environment and the user could use a mouse or other input device to select and change the position of the knot primitive in a 3D environment. In response, the rendering component could change the position and/or other attributes of the 3D curve rigging element.

In one embodiment, the rendering component may automatically use the curve rigging element to generate a rig for a 3D character. Such a rig may indicate the different ways the non-rigid portions of the 3D character can be moved or animated. In a particular embodiment, a second curve rigging element (e.g., a hidden curve rigging element that is not displayed to the user) may be utilized to help normalize the curve rigging element shown to the user (and used for rigging). The rig may indicate the different ways the non-rigid portions of the 3D character can be moved or animated. In one aspect a second "hidden" curve rigging element not displayed to the user may be utilized to help normalize the curve rigging element shown to the user (and used for rigging).

Hardware Overview

FIG. 1 depicts one architecture of a system 100 within which embodiments of the present disclosure may be implemented. This figure in no way limits or is intended to limit the scope of the present disclosure. System 100 may be a personal computer, video game console, personal digital assistant, rendering engine, or any other device suitable for practicing one or more embodiments of the present disclosure.

As shown, system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

CPU 102, render farm, and/or display processor 112 can employ any surface or volume rendering technique known in the art to create one or more rendered images from the provided data and instructions, including rasterization, scan-line rendering REYES or micropolygon rendering, ray casting, ray tracing, image-based rendering techniques, and/or combinations of these and any other rendering or image processing techniques known in the art.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Non-Rigid Model Rigging

Generally, embodiments described herein provide a curve element that comprises multiple, separate knot elements. Generally, such a curve element has the ability to infer or make its own decisions on how the resulting curve should be shaped. In other words, the use of the curve element effectively renders the control variables of the individual knot elements as optional, as the user does not need to define a value for each and every control variable for the knot elements. Rather, the user can define select control variables for select knot elements, and the logic of the curve element can dynamically determine the remaining control variables for the knot elements that make up the curve element. In some situations, the logic for the curve element can override a user-defined control variable for one of the knot elements, in order to make the behavior of the curve more pleasing on the whole. Thus, as opposed to conventional solutions where users must define every detail of every primitive that makes up a curve, embodiments allow animators to more efficiently animate curved objects.

Figure 2:
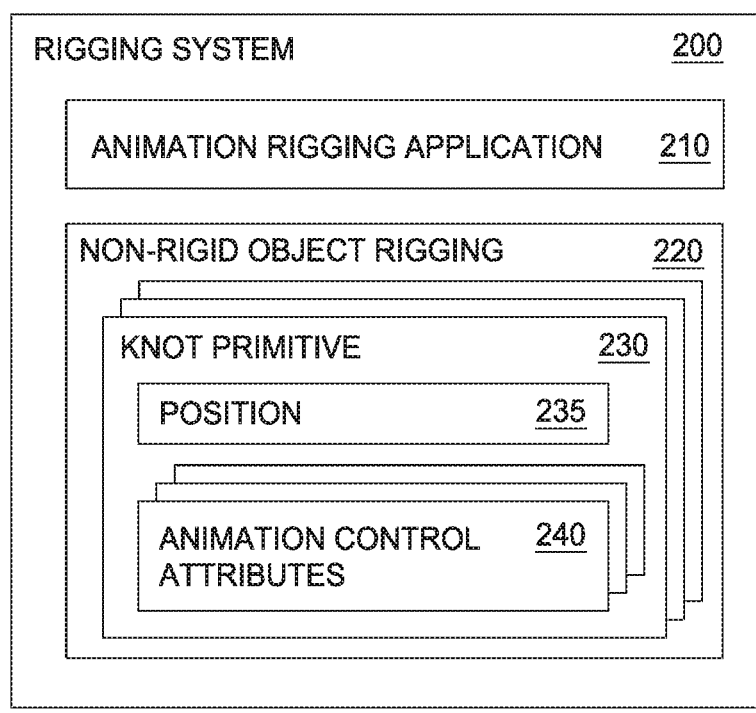
FIG. 2 is a block diagram of an animation rigging system, according to one embodiment described herein.

FIG. 2 is a block diagram of an animation rigging system, according to one embodiment described herein. As shown, the animation rigging system 200 includes an animation rigging application 210 and a non-rigid object rigging 220. The non-rigid object rigging 220 includes a plurality of knot primitives 230, where each knot primitive 230 defines a respective position 235 within a 3D scene and a plurality of animation control attributes 240. Generally, each knot primitive 230 represents a plurality of control points (also referred to as control vertices (CVs)). For example, in one embodiment, each knot is transformed into 2-7 native control points during rendering of an animation using the object rigging 220. Additionally, each knot primitive 230 provides a set of intrinsic transformations and is independently constrainable. That is, each knot is generally defined with a set of characteristics that are independent of each other knot within the object rigging 220.

As further described herein, the animation rigging system 200 creates new character rigs using a set of knot primitives in order to model the movement of non-rigid objects. The animation rigging application 210 generally represents a software program or group of programs executing on the animation rigging system 200 that facilitates modeling, rigging, rendering, and simulating animated objects and characters via the non-rigid object rigging 220.

Generally, the animation rigging application 210 is configured to generate the non-rigid object rigging 220 in order to animate a character model representing a non-rigid object. A non-rigid object generally refers to an object where the bending and flexing of at least a portion of the object are not controlled by fixed points (e.g., joints). Examples of such objects include, without limitations, octopus tentacles, snakes, blades of grass, ropes, and so on. More generally, however, embodiments described herein can be used to generating a rigging for any sort of object.

In one embodiment, the animation rigging application 210 provides a graphical user interface for defining the non-rigid object rigging 220. For example, such a user interface could allow users to create and manipulate the plurality of knot primitives 230. For example, the animation rigging application 210 could provide a user interface that enables the adjustment of the 3D position 235 of one of the knot primitives 230. In one embodiment, the animation rigging application 210 provides an interface through which the user can drag and drop a representation of the knot primitive 230 within a depiction of the 3d environment, in order to modify the position 235. As another example, the animation rigging application 210 could provide an interface explicitly specifying the position 235 (e.g., as a set of three-space coordinates).

Additionally, the animation rigging application 210 can provide a graphical user interface through which the animation control attributes 240 (also referred to herein as animation control variables) can be defined. In one embodiment, the animation rigging application 210 generates a curve using the non-rigid object rigging 220, such that the generated curve passes through the positions 235 of each of the knot primitives 230. Moreover, the animation rigging application 210 may use the set of criteria and/or heuristics defined by the animation control attributes 240 to determine the shape of the resulting the curve. In one embodiment, the rendering component uses tangent calculations, arc values, geometry twists, etc., to model the rigging element 220 in accordance with the knot primitives 230.

Generally, the animation rigging application 210 can provide a user interface through which values of animation control attributes 240 can be specified. For example, the animation control attributes 240 could include an indication of direction for the corresponding knot primitive 230, a measure of tangent length for the corresponding knot primitive 230, a twist control constraint (e.g., a frame normal) for the corresponding knot primitive 230, and a spline parameter value. More generally, however, the animation control attributes 240 may specify any attribute applicable to or associated with a knot primitive, and more generally any technique for defining the animation control attributes 240 can be used, consistent with the functionality described herein.

In one embodiment, the animation rigging application 210 is configured to automatically determine values for any of the animation control attributes 240 for the knot primitives 230, for which no value was explicitly specified (e.g., through the provided graphical user interface). As such, the animation rigging application 210 could generate a value(s) for one of the animation control attributes 240 for one of the knot primitives 230, for which a defined value was not received, based on the animation control attributes 240 of a neighboring knot primitive 230. For example, no direction attribute could be specified for a particular knot primitive 230, and the animation rigging application 210 could interpolate a direction for the particular knot primitive 230, based on a direction attribute of at least one neighboring knot primitive in the object rigging 220.

The animation rigging application 210 could then render an animation of a character using (at least in part) the object rigging 220. In doing so, the animation rigging application 210 could use any explicitly defined values for the animation control attributes 240 of the knot primitives 230, and could use generated values for the remaining animation control attributes 240 of the knot primitives 230. The rendered frames could then be output for display.

Of note, the animation rigging application 210 can enable users to define select animation control attributes 240 for the various knot primitives 230 at different points in time throughout the animation. For example, an animator could define (e.g., using a graphical user interface of the animation rigging application 210) a particular animation control attribute 240 for a particular knot primitive at a first moment in time, and at a subsequent moment in time, could undefine the particular animation control attribute 240, at which point the animation rigging application 210 can dynamically interpolate a value for the particular animation control attribute 240. Moreover, at the subsequent moment in time, the animator could define another animation control attribute 240 that was previously dynamically interpolated by the animation rigging application 210. By selectively defining only certain animation control attributes 240 of the knot primitives 230 over time and by dynamically interpolating the remaining animation control attributes 240, the animation rigging application 210 can efficiently animate a curved object while still allowing the animator to have full control over the object's behavior.

In one embodiment, in rendering the animation of the character using the object rigging 220, the animation rigging application 210 is configured to process each of the plurality of knot primitives 230 in order to generate a respective plurality of native control points. For example, and without limitation, the animation rigging application 210 could generate between 2 and 7 CVs from knot primitive 230. Of course, more generally, any number of CVs can be generated from a knot primitive 230, consistent with the functionality described herein. The animation rigging application 210 could then generate a Bézier cubic spline from the CVs generated from the plurality of knot primitives 230.

In one embodiment, the graphical user interface provided by the animation rigging application 210 could be used to manipulate the curve produced by the non-rigid object rigging 220 in a manner that breaks a tangency of the curve. For example, the animation rigging application 210 could receive a request within such a graphical user interface, and in response, could modify a particular knot primitive 230, in a manner that breaks a tangency of the curve at the position 235 of the knot primitive 230. While such functionality within the graphical user interface can be considered empowering to animators, the resulting curve may be undesirable due to the break in tangency.

As such, the animation rigging application 210 can be configured to automatically perform an operation in order to smooth out the resulting curve. In one embodiment, the animation rigging application 210 generates an additional rigging element that approximates a circular arc between the respective positions of two or more knot primitives 230 that are adjacent to the modified knot primitive 230 within the object rigging 220. The animation rigging application 210 could then insert the generated rigging element into the object rigging 220. Doing so results in a smoother, more aesthetically pleasing curve in the rendered frames.

In one embodiment, the animation rigging application 210 is configured to calculate the positions and attributes used to generate the final curve, and does not directly use every value provided by the user. That is, even though an animator may have specified a particular tangent handle for a particular knot primitive, the animation rigging application 210 could calculate and use a different tangent handle when rendering the curve. In such an embodiment, although the user interface provided by the animation rigging application 210 represents to the user that they are directly controlling the knot primitives (e.g., by specifying the particular tangent handle for the knot primitive), the animation rigging application 210 can instead intelligently modify the inputs provided by the user. For example, where the user's modifications to the curve result in a break in tangency at one or more points along the curve, the animation rigging application 210 can generate and insert additional elements in the curve, shaped in a way that eliminates the mathematical discontinuity that would occur if the user were directly controlling specific control points of the curve. By selectively ignoring selected parts of the user input and by selectively substituting other values instead, the animation rigging application 210 can ultimately provide a better user experience and more aesthetically pleasing rendered frames, while still allowing the user to control various attributes of the knot primitives.

As discussed above, in rendering animations using the object rigging 220, the animation rigging application 210 can automatically determine values for the animation control attributes 240 that are not explicitly defined (e.g., by an animator using a provided graphical user interface). In one embodiment, the animation rigging application 210 is configured to determine a value for a direction control attribute 240 for a particular knot primitive 230, based on a direction control attribute 240 for at least one other knot primitive 230 in the object rigging 220. For example, the animation rigging application 210 could interpolate an orientation of the particular knot primitive 230, that is positioned between a first and a second knot primitive 230, by a performing a torque-minimal rotation framewalk algorithm, from the first knot primitive 230 to the second knot primitive 230. Additionally, the animation rigging application 210 could perform a second torque-minimal rotation framewalk algorithm, this time from the second knot primitive 230 to the first knot primitive 230. The animation rigging application 210 could then perform a spherical linear interpolation between the results of the torque-minimal rotation framewalk algorithms. Doing so enables the animated character to respond realistically when twisted, without requiring the animator to manually control the orientation of each knot primitive 230.

Additionally, the animation rigging application 210 could receive a request (e.g., within a provided graphical user interface) to lock the position of a second one of the plurality of knot primitives. That is, for some animations, it may be desirable to have a particular point be anchored to another object within the three-dimensional scene being rendered. As an example, the object rigging 220 could model the movement of a rope having one end anchored to a particular point on a modelled floor structure. As such, if the other end of the rope is twisted, the animation rigging application 210 could determine that the positions, orientations and other attributes of the intervening points on the rope (represented by select knot primitives 230 within the object rigging 220) change based on the twist. However, the animation rigging application 210 could determine that the position and orientation of the anchored knot primitive 230 remain constant. Doing so enables animators to more easily produce animations for non-rigid objects having fixed positions (e.g., a blade of grass fixed to the ground, a base of a tentacle that is fixed to an octopus' body, etc.).

Figure 3A:
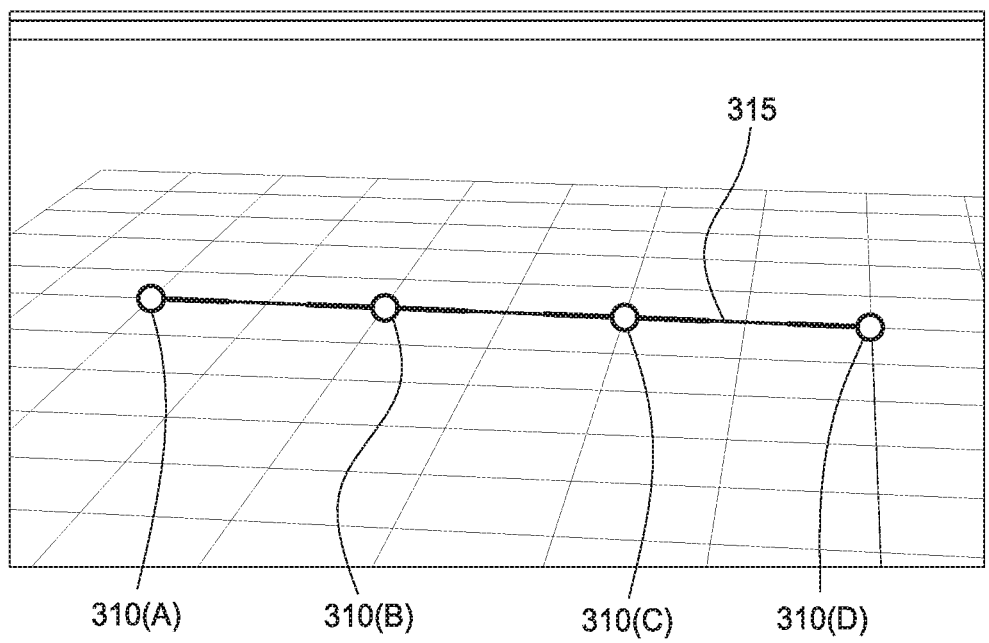
FIGS. 3A-B illustrate graphical interfaces for manipulating a rigging constructed from knot primitives, according to one embodiment described herein.
Figure 3B:
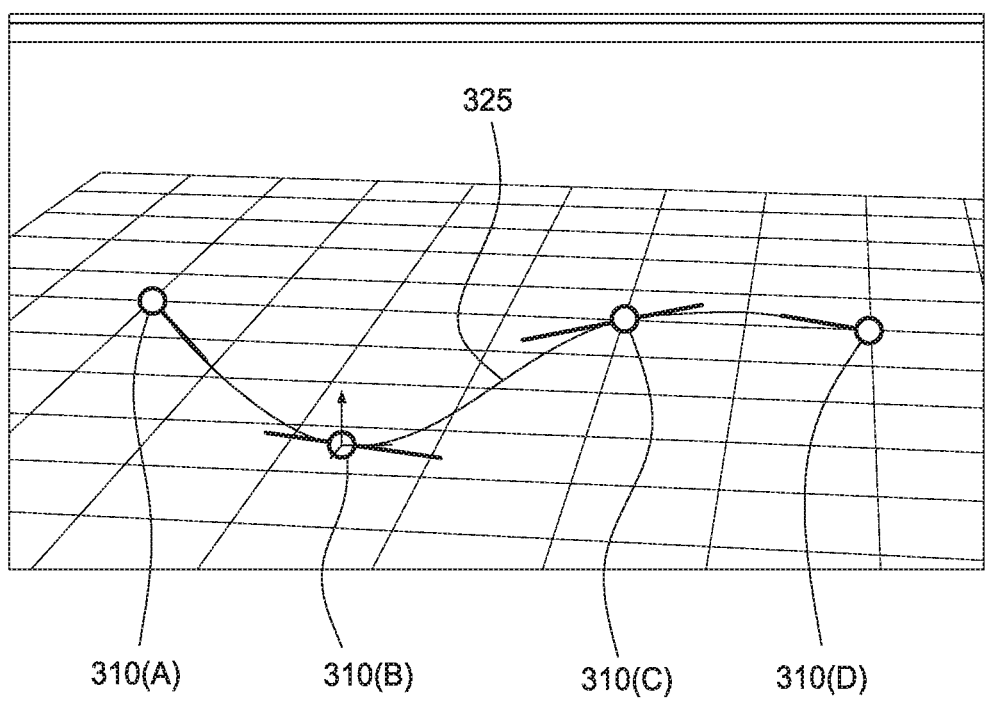

FIGS. 3A-B illustrate graphical interfaces for manipulating a rigging constructed from knot primitives, according to one embodiment described herein. As shown, the graphical user interface 300 shown in FIG. 3A illustrates a plurality of knot primitives 310(A)-(D), which form a 3D curve 315. Generally, the animation rigging application 210 can provide the graphical user interface 300 so that a user (e.g., an animator) can manipulate the positions of the knot primitives as well as other attributes of the knot primitives (e.g., orientation, locking a knot primitive to another structure in the 3D scene, etc.).

An example of such a manipulation is shown in FIG. 3B, where the graphical user interface 320 shows the plurality of knot primitives 310(A)-(D) where the position of knot primitive 310(B) has been modified. In response, the animation rigging application 210 has updated the curve 325 resulting from the knot primitives 310(A)-(D). As shown, the animation rigging application 210 has automatically adapted the curve 325, based on the updated position of the knot primitive 310(B) as well as the various animation control attributes 240 of the knot primitives 310(A)-(D). Advantageously, doing so enables the animation rigging application 210 to automatically update the resulting curve 325, without requiring the animator to manually manipulate every facet of the curve 325.

Figure 4A:
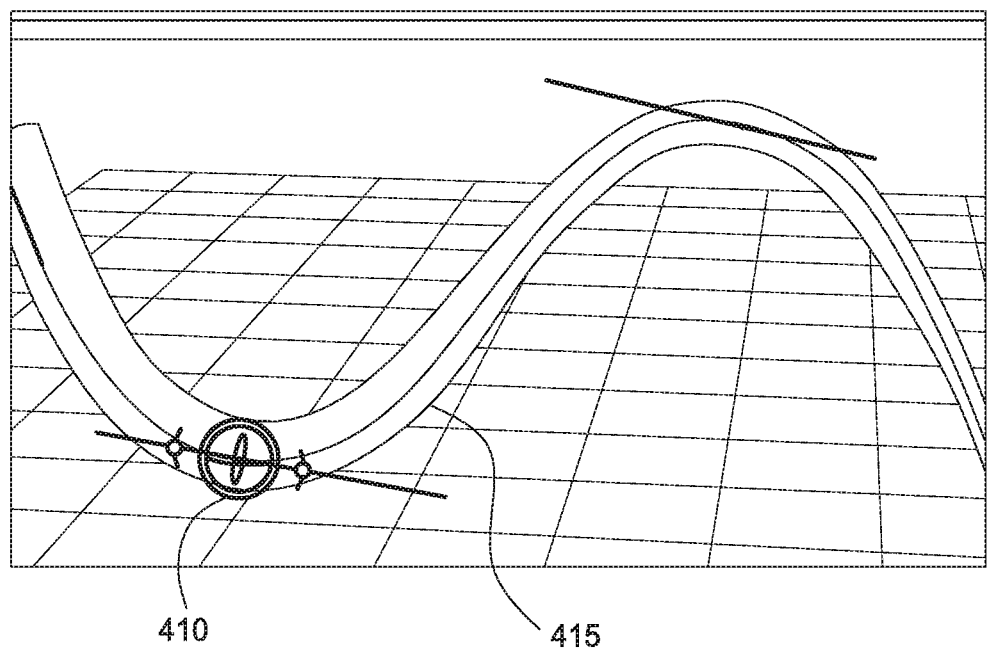
FIGS. 4A-C illustrate graphical interfaces for automatically manipulating a rigging constructed from knot primitives, according to one embodiment described herein.

In one embodiment, the animation rigging application 210 is configured to perform an automated smoothing operation, in response to changes made by an animator using the provided graphical user interface. Such an example will now be discussed with respect to FIGS. 4A-C, which illustrate graphical interfaces for automatically manipulating a rigging constructed from knot primitives, according to one embodiment described herein. As shown, the graphical user interface 400 shown in FIG. 4A depicts a knot primitive 410 and a resulting curve 415. As discussed above, an animator can use the graphical user interface provided by the animation rigging application 210 to edit various attributes of the knot primitive 410.

Figure 4B:
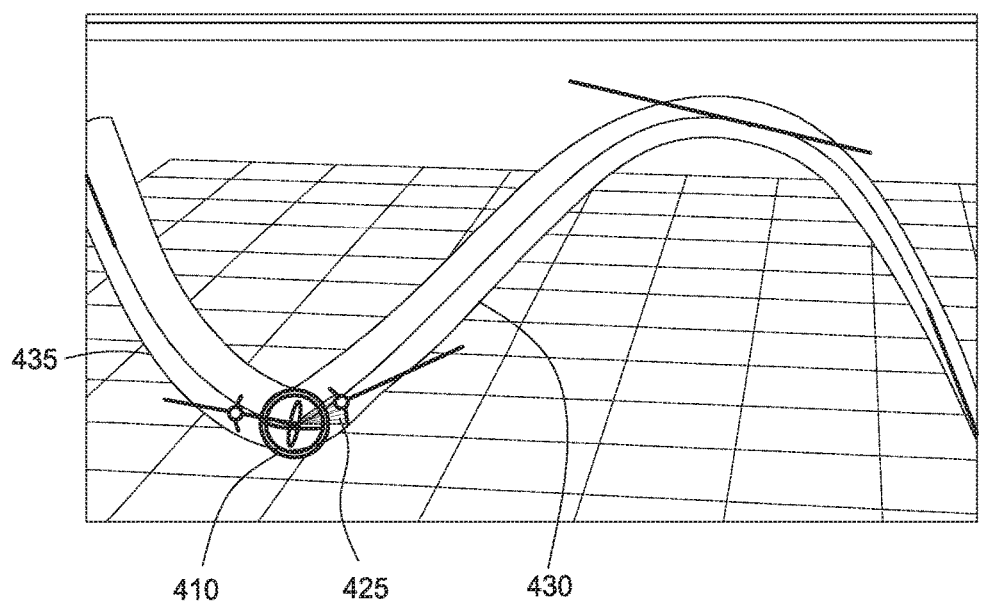

In some instances, the animator may wish to break the tangency between various CVs that make up the curve, in order to edit a specific portion of the curve without altering the entire curve. An example of such an edit operation is shown in FIG. 4B, where the illustration 420 depicts the knot primitive 410, an edit operation to a CV resulting from the knot primitive 425 and the resulting curve 430. As part of the edit operation 425, the user has broken the tangency of the curve 430 in order to modify the appearance of the curve 430 around the knot primitive 410. However, as a result, the smoothness of the curve has been lost, as can be seen at point 435 along the curve. Such a sharp bend at the point 435, however, is not aesthetically pleasing and is undesirable in many circumstances, as it may not realistically represent the movement of the object being modelled.

Figure 4C:
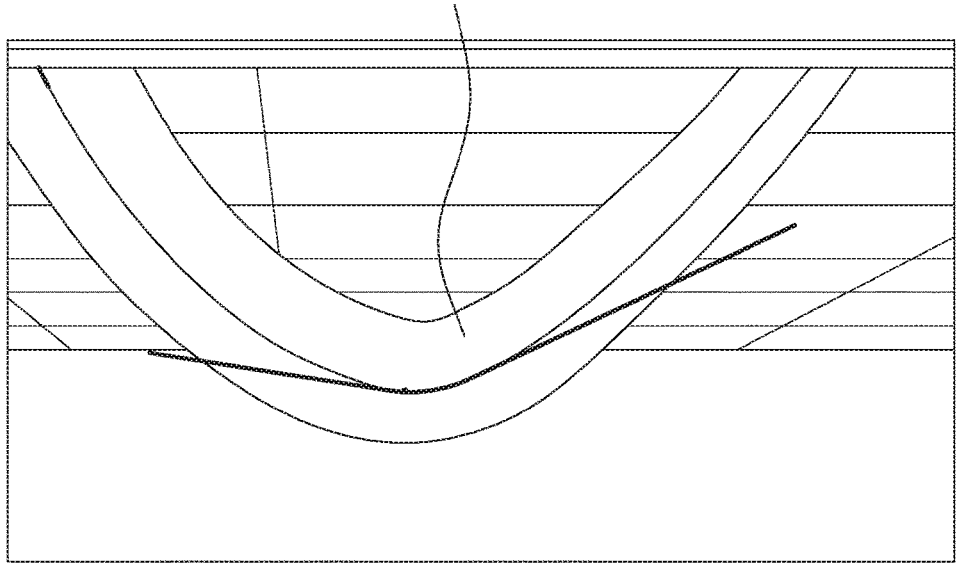

As such, the animation rigging application 210 can be configured to perform an automated smoothing operation, while maintaining the break in tangency and avoiding altering the appearance of the entirety of the curve. For example, the animation rigging application 210 could generate a second 3D curve rigging element that approximates a circular arc between knot primitives that are adjacent to the knot primitive 410 in the rigging. In one embodiment, the animation rigging application 210 is configured not to display the second 3D curve rigging element, but instead to use it in modifying the curve element 430. In the present example, the animation rigging application 210 inserts the second 3D curve rigging element into the curve 430, thereby smoothing over the sharp break at the point 435 of the curve 430. The resulting curve is shown in FIG. 4C, where the graphical user interface 440 depicts a zoomed in view of the resulting curve. As shown by point 445, the resulting curve no longer includes the sharp break at point 435. Advantageously, doing so enables animators to make changes to only a portion of the rigging without affecting the entirety of the rigging and without introducing sharp break points due to breaks in tangency between the CVs that make-up the curve.

Figure 5:
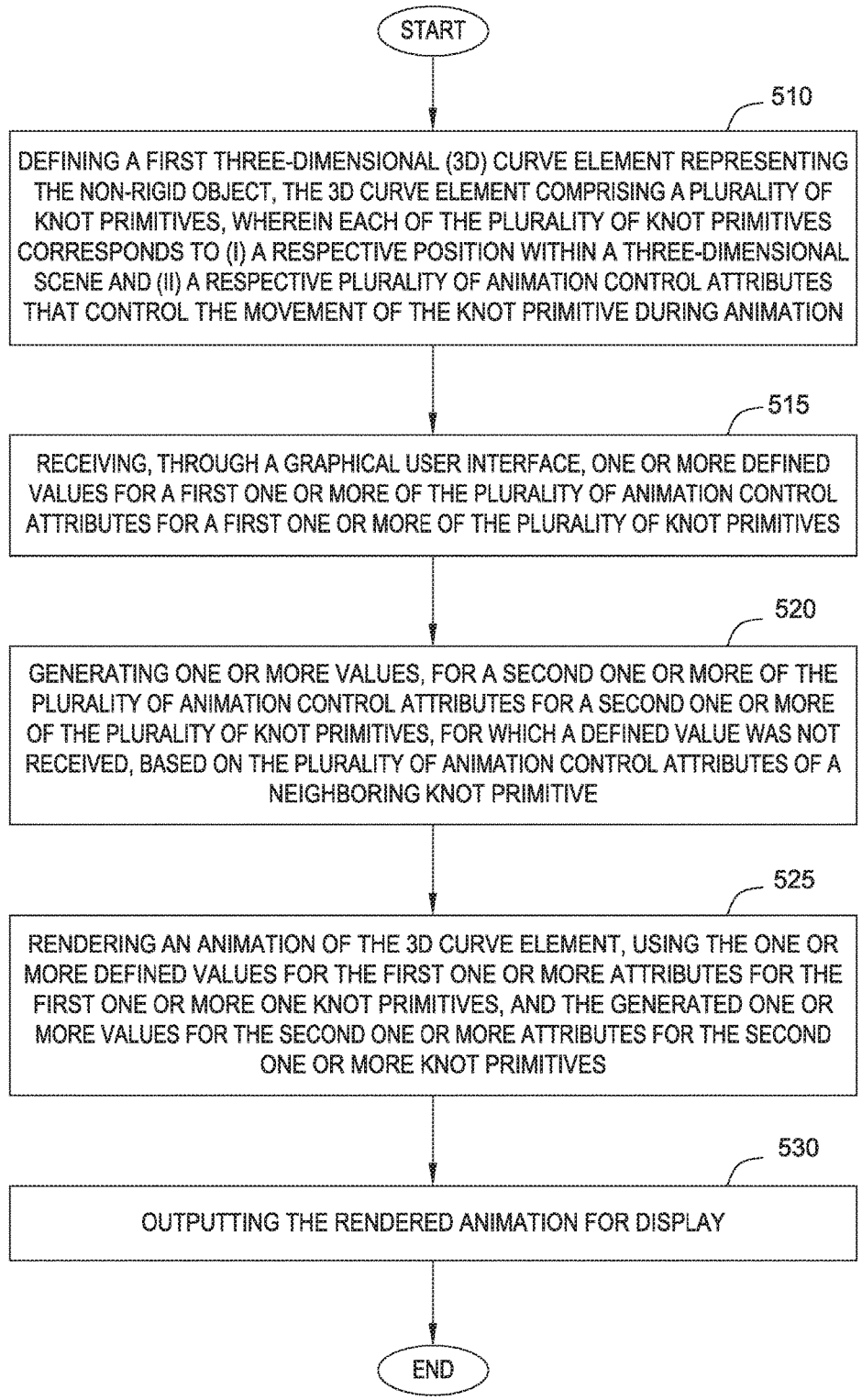
FIG. 5 is a flow diagram illustrating a method of animating an object using a 3D curve rigging element, according to one embodiment described herein.

FIG. 5 is a flow diagram illustrating a method of animating an object using a 3D curve rigging element, according to one embodiment described herein. As shown, the method 500 begins at block 510, where the animation rigging application 210 defines a first 3D curve rigging element for a non-rigid object. The curve rigging element is made-up of a plurality of knot primitives, where each knot primitive corresponds to a respective position within a three-dimensional scene and a respective plurality of animation control attributes that control the movement of the knot primitive during animation.

The animation rigging application 210 then receives (e.g., through a graphical user interface) one or more defined values for a first one or more of the plurality of animation control attributes for a first one or more of the plurality of knot primitives (block 515). As discussed above, the animation rigging application 210 is generally configured to allow users (e.g., animators) to manually define any number of properties of the knot primitives, including the respective positions of each of the knot primitives and any of the plurality of animation control attributes for the knot primitives.

Moreover, the animation rigging application 210 can generate values for any remaining properties of the knot primitives not defined by the user. In doing so, the animation rigging application 210 can consider the values defined for neighboring knot primitives within the rigging. As such, in the method 500, the animation rigging application 210 generates one or more values, for a second one or more of the plurality of animation control attributes for a second one or more of the plurality of knot primitives, for which a defined value was not received, based on the plurality of animation control attributes of a neighboring knot primitive (block 520). For example, if the animator specifies a change in direction for a particular knot primitive, indicating a twist in the rigging, the animation rigging application 210 could generate a corresponding change in direction for a knot primitive adjacent to the particular knot primitive within the rigging. Doing so enables the animator to only define a subset of the animation control attributes for the knot primitives that are needed to achieve a desired resulting animation.

The animation rigging application 210 renders an animation using the first 3D curve rigging element (block 525). In doing so, the animation rigging application 210 uses the one or more defined values for the first one or more attributes for the first one or more one knot primitives, and the generated one or more values for the second one or more attributes for the second one or more knot primitives. In other words, the animation rigging application 210 may use all of the explicitly defined positions and animation control attributes, and can then interpolate or otherwise calculate values for the remaining position and animation control attributes in the rigging. The animation rigging application 210 outputs the rendered animation for display (block 530), and the method 500 ends In the preceding, reference is made to embodiments of the invention. However, it should be understood that the invention is not limited to specific described embodiments. Instead, any combination of the described features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of animating a non-rigid object in a computer graphics environment, the method comprising:
   defining a first three-dimensional (3D) curve rigging element representing the non-rigid object, the 3D curve rigging element comprising a plurality of knot primitives, wherein each of the plurality of knot primitives corresponds to:
      a respective position within a three-dimensional scene; and
      a respective plurality of animation control attributes that control the movement of the knot primitive during animation;
   receiving one or more defined values for a first one or more of the plurality of animation control attributes for a first one or more of the plurality of knot primitives;
   generating one or more values, for a second one or more of the plurality of animation control attributes for a second one or more of the plurality of knot primitives based on the plurality of animation control attributes of a neighboring knot primitive;
   rendering an animation using the first 3D curve rigging element, using the received one or more defined values, and the generated one or more values, comprising interpolating an orientation of at least one point on the first 3D curve rigging element between the first and second knot primitives, by a performing a torque-minimal rotation framewalk algorithm from the first knot primitive to the second knot primitive; and
   outputting the rendered animation for display.

2. The method of claim 1, wherein each of the plurality of knot primitives comprises a respective scene graph object, and wherein each scene graph object is individually constrainable within the computer graphics environment.

3. The method of claim 1, wherein the plurality of animation control attributes for a first one of the plurality of knot primitives includes an indication of direction.

4. The method of claim 1, wherein the plurality of animation control attributes for a first one of the plurality of knot primitives includes a measure of tangent length.

5. The method of claim 1, wherein the plurality of animation control attributes for a first one of the plurality of knot primitives includes a twist control constraint.

6. The method of claim 1, wherein the plurality of animation control attributes for a first one of the plurality of knot primitives includes a spline parameter value.

7. The method of claim 1, wherein rendering the animation using the first 3D curve rigging element further comprises:
   processing each of the plurality of knot primitives to generate a respective plurality of native control points; and
   generating a Bézier cubic spline from the pluralities of native control points for the plurality of knot primitives.

8. The method of claim 1, further comprising:
   receiving a request to modify the first 3D curve rigging element at a first one of the plurality of knot primitives, in a manner that breaks a tangency of the first 3D curve rigging element at the position of the first knot primitive;
   generating a second 3D curve rigging element that approximates a circle arc between the respective positions of a second and third one of the plurality of knot primitives, wherein the second and third knot primitives are adjacent to the first knot primitive within the first 3D curve rigging element; and
   inserting the second 3D curve rigging element into the first 3D curve rigging element.

9. The method of claim 8, wherein the second 3D curve rigging element is not depicted within the graphical user interface.

10. The method of claim 1, wherein a torque-minimal rotation value is calculated based in part on a value for a first one of the plurality of animation control attributes for the first knot primitive, wherein the first animation control attribute specifies an indication of direction.

11. The method of claim 1, wherein interpolating the orientation of at least one point on the first 3D curve rigging element between the first and the second knot primitive of the plurality of knot primitives further comprises:
   performing a second torque-minimal rotation framewalk algorithm for the first 3D curve rigging element from the second knot primitive to the first knot primitive; and performing a spherical linear interpolation between results of the first torque-minimal rotation framewalk algorithm and the second torque-minimal rotation framewalk algorithm.

12. The method of claim 1, further comprising:
providing a graphical user interface through which a position of a first one of the plurality of knot primitives can be altered at a specified point in time.

13. The method of claim 12, further comprising:
receiving a request to lock the position of a second one of the plurality of knot primitives,
wherein the position of the second knot primitive remains fixed during the period of time when rendering an animation of the first 3D curve rigging element, using the one or more defined values for the first one or more attributes for the first one or more one knot primitives, and the generated one or more values for the second one or more attributes for the second one or more knot primitives.

14. The method of claim 1, wherein the one or more defined values for the first one or more animation control attributes are received at a first moment in time, and further comprising:
receiving, at a second moment in time that is subsequent to the first moment in time, a second one or more defined values for a third one or more of the plurality of animation control attributes for a third one or more of the plurality of knot primitives; and
generating a second one or more values, for a fourth one or more of the plurality of animation control attributes for a fourth one or more of the plurality of knot primitives based on the plurality of animation control attributes of a second neighboring knot primitive.

15. The method of claim 14, further comprising:
receiving, at a third moment in time that is subsequent to the first moment in time, a request to undefine the first one or more animation control attributes for the first one or more knot primitives; and
dynamically generating one or more values for the undefined first one or more animation control attributes for the first one or more knot primitives.

16. A system, comprising:
a processor; and
a non-transitory memory containing computer program code that, when executed by the processor, performs an operation for animating a non-rigid object in a computer graphics environment, the operation comprising:
defining a first 3D curve rigging element representing the non-rigid object, the first 3D curve rigging element comprising a plurality of knot primitives, wherein each of the plurality of knot primitives corresponds to:
a respective position within a three-dimensional scene; and
a respective plurality of animation control attributes that control the movement of the knot primitive during animation;
receiving one or more defined values for a first one or more of the plurality of animation control attributes for a first one or more of the plurality of knot primitives;
generating one or more values, for a second one or more of the plurality of animation control attributes for a second one or more of the plurality of knot primitives, based on the plurality of animation control attributes of a neighboring knot primitive;
rendering an animation using the first 3D curve rigging element, using the received one or more defined values, and the generated one or more values, comprising interpolating an orientation of at least one point on the first 3D curve rigging element between the first and second knot primitives, by a performing a torque-minimal rotation framewalk algorithm from the first knot primitive to the second knot primitive; and
outputting the rendered animation for display.

17. The system of claim 16, the operation further comprising:
receiving a request to modify the first 3D curve rigging element at a first one of the plurality of knot primitives, in a manner that breaks a tangency of the first 3D curve rigging element at the position of the first knot primitive;
generating a second 3D curve rigging element that approximates a circle arc between the respective positions of a second and third one of the plurality of knot primitives, wherein the second and third knot primitives are adjacent to the first knot primitive within the first 3D curve rigging element; and
inserting the second 3D curve rigging element into the first 3D curve rigging element.

18. The system of claim 16, wherein a torque-minimal rotation value is calculated based in part on a value for a first one of the plurality of animation control attributes for the first knot primitive, wherein the first animation control attribute specifies an indication of direction, and further comprising:
performing a second torque-minimal rotation framewalk algorithm for the first 3D curve rigging element from the second knot primitive to the first knot primitive; and
performing a spherical linear interpolation between results of the first torque-minimal rotation framewalk algorithm and the second torque-minimal rotation framewalk algorithm.

19. A non-transitory computer-readable medium containing computer program code that, when executed by operation of one or more computer processors, performs an operation for animating a non-rigid object in a computer graphics environment, the operation comprising:
defining a first 3D curve rigging element representing the non-rigid object, the first 3D curve rigging element comprising a plurality of knot primitives, wherein each of the plurality of knot primitives corresponds to:
a respective position within a three-dimensional scene; and
a respective plurality of animation control attributes that control the movement of the knot primitive during animation;
receiving one or more defined values for a first one or more of the plurality of animation control attributes for a first one or more of the plurality of knot primitives;
generating one or more values, for a second one or more of the plurality of animation control attributes for a second one or more of the plurality of knot primitives, based on the plurality of animation control attributes of a neighboring knot primitive;
rendering an animation using the first 3D curve rigging element, using the received one or more defined values, and the generated one or more values, comprising interpolating an orientation of at least one point on the first 3D curve rigging element between the first and second knot primitives, by a performing a torque-minimal rotation framewalk algorithm from the first knot primitive to the second knot primitive; and outputting the rendered animation for display.

20. A system, comprising:

a processor; and a non-transitory memory containing computer program code that, when executed by the processor, performs an operation for animating a non-rigid object in a computer graphics environment, the operation comprising:

defining a first 3D curve rigging element representing the non-rigid object, the first 3D curve rigging element comprising a plurality of knot primitives, wherein each of the plurality of knot primitives corresponds to:

a respective position within a three-dimensional scene; and a respective plurality of animation control attributes that control the movement of the knot primitive during animation;

receiving one or more defined values for a first one or more of the plurality of animation control attributes for a first one or more of the plurality of knot primitives;

generating one or more values, for a second one or more of the plurality of animation control attributes for a second one or more of the plurality of knot primitives, based on the plurality of animation control attributes of a neighboring knot primitive;

receiving a request to modify the first 3D curve rigging element at a first one of the plurality of knot primitives, in a manner that breaks a tangency of the first 3D curve rigging element at the position of the first knot primitive;

generating a second 3D curve rigging element that approximates a circle arc between the respective positions of a second and third one of the plurality of knot primitives, wherein the second and third knot primitives are adjacent to the first knot primitive within the first 3D curve rigging element; and inserting the second 3D curve rigging element into the first 3D curve rigging element;

rendering an animation using the first 3D curve rigging element, using the received one or more defined values, and the generated one or more values; and outputting the rendered animation for display.

* * * * *